(12) United States Patent
Ichikawa et al.

(10) Patent No.: US 7,493,013 B2
(45) Date of Patent: Feb. 17, 2009

(54) INFORMATION STORAGE MEDIUM HAVING A PROGRAM CHAIN COMMAND TABLE STRUCTURE

(75) Inventors: Teiichi Ichikawa, Yokohama (JP); Yumiko Taga, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 685 days.

(21) Appl. No.: 10/743,553

(22) Filed: Dec. 23, 2003

(65) Prior Publication Data

US 2004/0151083 A1      Aug. 5, 2004

(30) Foreign Application Priority Data

Dec. 26, 2002   (JP) .............. 2002-378646

(51) Int. Cl.
*H04N 5/93* (2006.01)
(52) U.S. Cl. .................. 386/64; 386/126; 386/65; 386/127
(58) Field of Classification Search ................ None
See application file for complete search history.

(56) References Cited

U.S. PATENT DOCUMENTS

| | | | |
|---|---|---|---|
| 5,923,627 A | * | 7/1999 | Miwa et al. ............ 386/70 |
| 6,282,320 B1 | * | 8/2001 | Hasegawa et al. ......... 382/233 |
| 6,285,823 B1 | * | 9/2001 | Saeki et al. ................ 386/95 |
| 6,388,961 B1 | | 5/2002 | Ichi |
| 6,424,793 B1 | * | 7/2002 | Setogawa et al. ........... 386/95 |
| 2002/0003536 A1 | | 1/2002 | Kim et al. |

FOREIGN PATENT DOCUMENTS

| | | |
|---|---|---|
| CN | 1276605 A | 12/2000 |
| CN | 1331443 A | 1/2002 |
| JP | 8-339665 | 12/1996 |
| JP | 2000-82275 | 3/2000 |

\* cited by examiner

*Primary Examiner*—Josseph Feild
*Assistant Examiner*—Joseph Haley
(74) *Attorney, Agent, or Firm*—Pillsbury Winthrop Shaw Pittman, LLP

(57) ABSTRACT

An information recording method of recording object information (VOB) and reproducing control information (PGC) is provided. In this method, while the object information is recorded, the reproducing control information (PGC) defining a method of reproducing the object information and further defining a predetermined command executed according to a predetermined operation of a user is recorded in an information recording medium, and a desired reproducing action can be carried out by allocating an arbitrary command and the like to an arbitrary operation.

4 Claims, 10 Drawing Sheets

FIG. 3

| PGC information | PGC general information |
| | PGC command table |
| | PGC program map |
| | PGC cell reproduction information table |
| | PGC cell position information table |
| | PGC user-operable transition information |

PGC user-operable transition information:
- PGC number in resuming operation
- PGC number in pausing operation

FIG. 5

| PGC information | PGC general information |
| | PGC command table |
| | PGC program map |
| | PGC cell reproduction information table |
| | PGC cell position information table |

PGC command table:
- Pre-command
- Post-command
- Cell command
- User-operable call back command

INFORMATION STORAGE MEDIUM HAVING A PROGRAM CHAIN COMMAND TABLE STRUCTURE

CROSS-REFERENCE TO RELATED APPLICATIONS

This application is based upon and claims the benefit of priority from the prior Japanese Patent Application No. 2002-378646, filed Dec. 26, 2002, the entire contents of which are incorporated herein by reference.

BACKGROUND OF THE INVENTION

1. Field of the Invention

The present invention relates to a method of recording image information and reproducing control information into an information recording medium, particularly relates to a recording method and a reproducing apparatus, which execute other pieces of reproducing control information, a command or the like which is further defined in the reproducing control information, and an information recording medium thereof.

2. Description of the Related Art

Recently DVD (Digital Versatile Disk) has been developed as a high-density recording medium, a DVD-Video system in which the image information is recorded into a DVD has been established, and a reproducing apparatus compatible with DVD-Video system is widely spreading.

With reference to the prior art of DVD-Video system, there is known Jpn. Pat. Appln. KOKAI Publication No. 8-339665 which discloses "an information recording medium capable of performing interactive reproduction and its reproducing system." That is, the DVD-Video disk is configured to reproduce a video object (hereinafter referred to as VOB), which is material substance, on the basis of the reproducing control information called a program chain (hereinafter referred to as PGC).

A data structure in the DVD disk is broadly divided into VOB and PGC. The coded image information is recorded with speech (and sub-image information) in VOB. VOB is divided into reproducing units called cell. On the other hand, PGC includes a control command of a pre-command, a post-command, and a cell command and at least a zero program. Each program includes at least one cell, and the cell of VOB to be reproduced is specified in each cell.

In the case of the reproduction, the pre-command of the PGC is executed and a parameter is set as required in the reproducing apparatus. A branch command may be described in the pre-command. When the branch outside the PGC is specified by the command, the reproduction of the PGC is suspended and the reproduction of the branched PGC described in the command is started.

When the branch outside the PGC is not generated in the pre-command, the reproduction of the cell (to be more precise, the reproduction of the cell of the VOB specified by the cell of the PGC) is orderly and sequentially started from program No. 1. In the DVD-Video standard, the cell command can be also specified in each cell of the PGC. When the cell command is specified, the cell command is executed when the reproduction of the cell is finished. When the reproduction up to the final cell is completed by sequentially executing such reproduction of the cell, the post-command of the PGC is executed. The branch command may be also described even in the post-command. When the branch outside the PGC is specified by the command, the reproduction of the PGC is suspended and the reproduction of the branched PGC described in the command is started.

When the branch is not generated in the post-command, presence or absence of the next PGC is decided. When the next PGC is specified, the branch to the specified PGC is executed. When the next PGC is not specified, the reproduction is finished.

However, in the above-described prior art, transition of the PGC reproduction is limited because the transition of the PGC reproduction is defined only by the pre-command, the post-command, and the cell command.

For example, in the disk in which a movie or the like is recorded, an original story is recorded as PGC No. 1 and a value-added image (hereinafter referred to as VAM) such as making the story is recorded as PGC No. 2 in a title space. After the reproducing image is transited to the VAM by a button operation in the original story, in the case that a user executes a resuming operation when a menu is called from the VAM and the menu is displayed on the screen, the reproducing image is transited to PGC No. 2, which is finally reproduced in the title space, namely the VAM. Since no command can be executed to the resuming operation and resuming information can not be changed in the current DVD standard, even if a disk manufacturing side considers reproducing the image of the original story (PGC No. 1) in such a case, the disk manufacturing side can not realize it.

When the user does not operate the menu for a certain period in the reproduction, even if the disk manufacturing side considers reproducing the image previously prepared (such as a screen saver), the disk manufacturing side can not realized it because the command realizing it can not be recorded. Thus, in the DVD-Video standard, since the arbitrary command can not be allocated to the PGC information, there is a problem that action in the reproduction and the like are limited and the action which the disk manufacturing side desires can not be set.

BRIEF SUMMARY OF THE INVENTION

An embodiment of the invention is an information recording method for recording object information (VOB) and reproducing control information (PGC), the method comprising: recording the object information including coded image information in an information recording medium; and recording the reproducing control information, which defines a method of reproducing the object information and further defines a predetermined command executed according to a predetermined operation of a user, in the information recording medium.

BRIEF DESCRIPTION OF THE SEVERAL VIEWS OF THE DRAWING

FIG. 3 shows an example of the structure of PGC information according to a first embodiment of the invention;

FIG. 5 shows an example of the structure of PGC information according to a second embodiment of the invention;

FIG. 9 shows an example of the structure of PGC information according to a fourth embodiment of the invention;

DETAILED DESCRIPTION OF THE INVENTION

Embodiments of the invention will be described below referring to the accompanying drawings.

Figure 1:
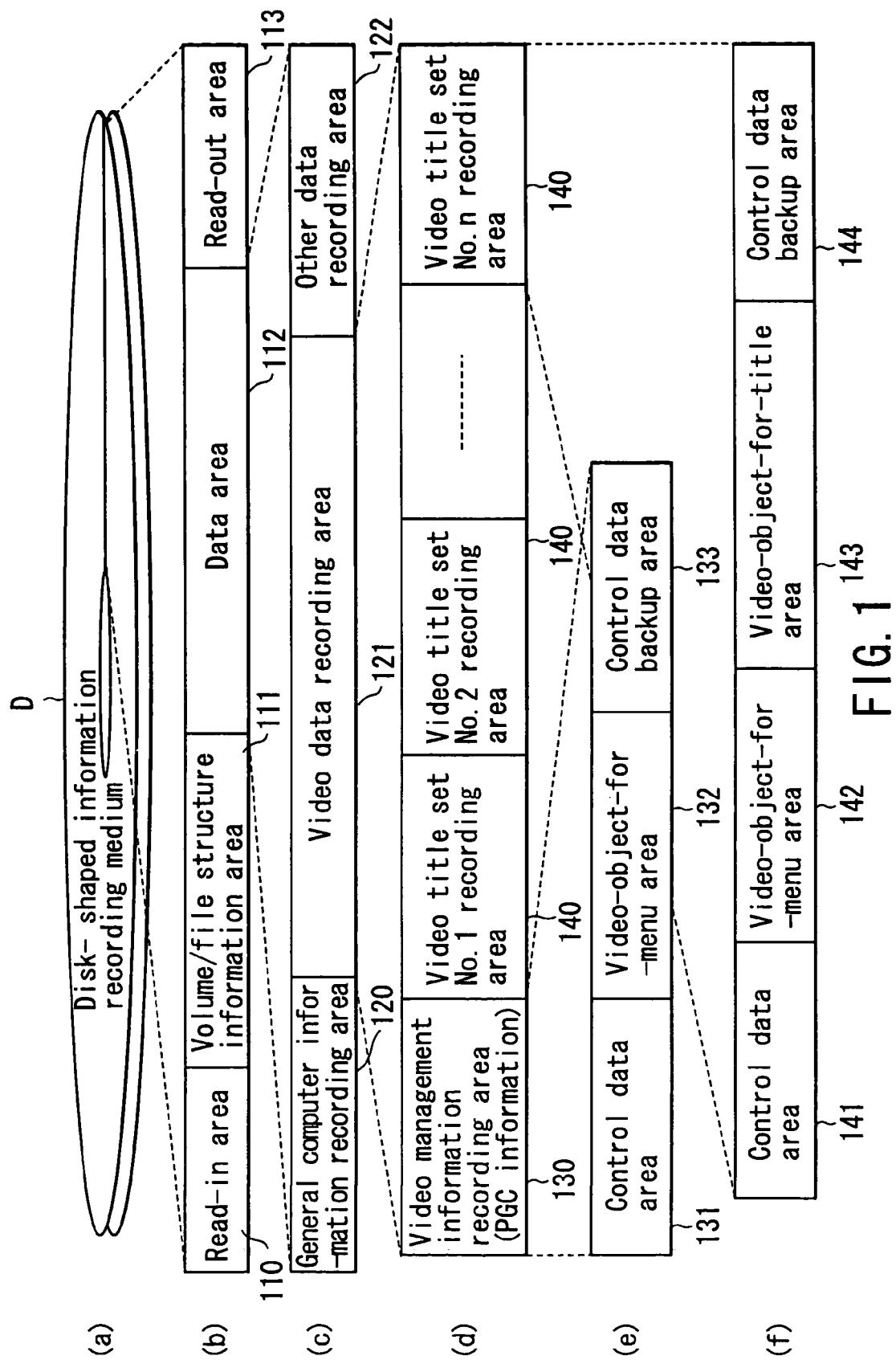
FIG. 1 shows an example of a structure of an optical disk according to the invention.
Figure 2:
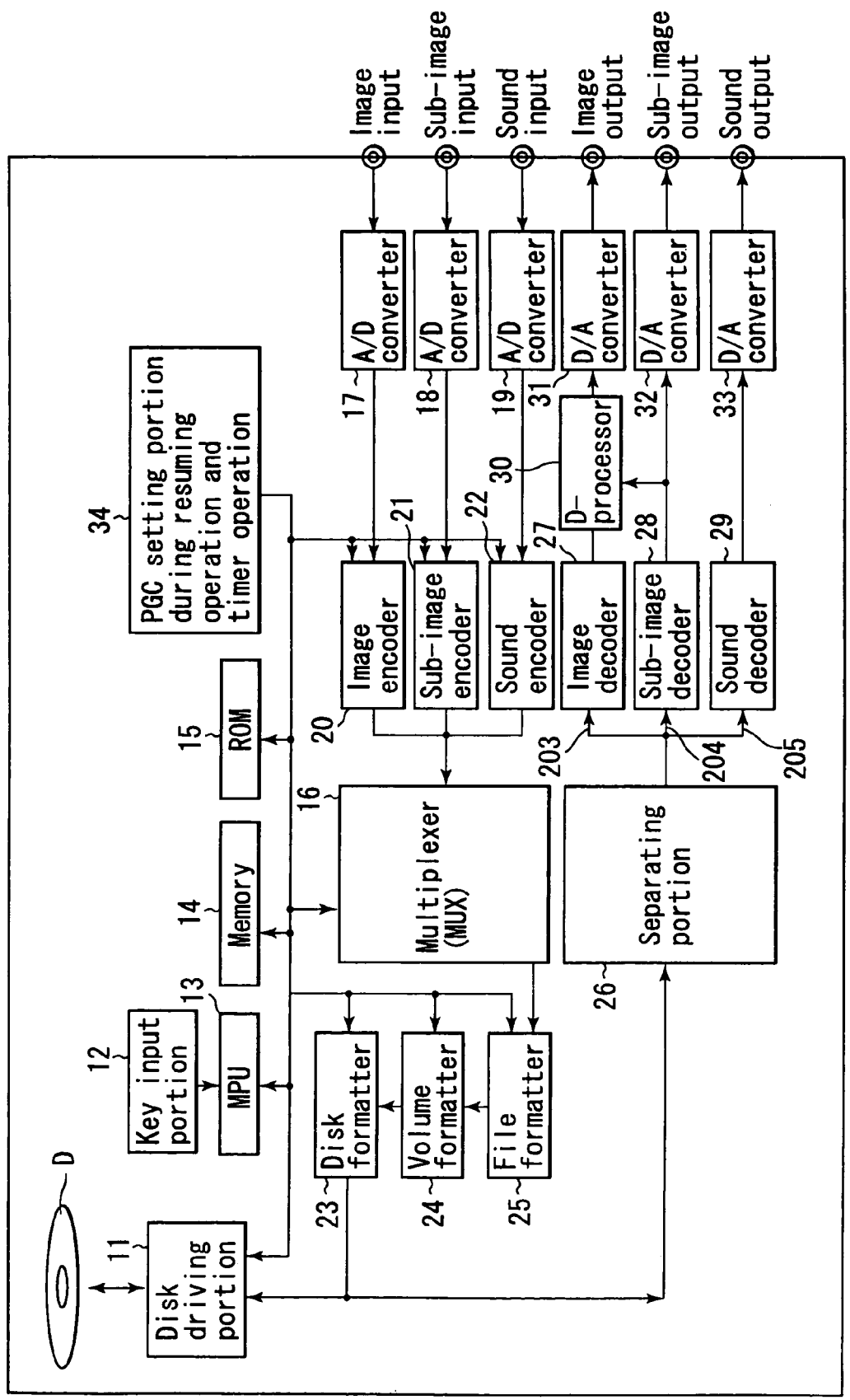
FIG. 2 shows an example of the structure of an optical disk apparatus dealing with the optical disk according to the invention.

FIG. 1 shows an example of a structure of an optical disk according to the invention, and FIG. 2 shows an example of the structure of an optical disk apparatus dealing with the optical disk according to the invention.

<Example of Structure of Optical Disk According to the Invention>

As for PGC information according to the invention, the structure of the optical disk will be described at first referring to the drawings.

FIG. 1 generally shows a data structure of a disk-shaped information recording medium D described in this embodiment. As shown in (b) of FIG. 1, the information recording medium D has a read-in area 110, a volume/file structure information area 111, a data area 112, and a read-out area 113 from its inside.

As shown in (c) of FIG. 1, the data area 112 includes a general computer information recording area 120, a video data recording area 121, and an other data recording area 122.

As shown in (d) of FIG. 1, the video data recording area 121 has a video management information recording area 130 which is program chain information PGC, for managing whole information recorded in the information recording medium D and at least one video title set No. n recording area 140 for managing information in each title.

The program chain information PGC, which is a feature of the invention, is described in detail later.

As shown in (e) of FIG. 1, the video management information recording area 130 includes a control data (HD_VMG. IFO file) area 131, a video-object-for-menu (HD_VMGM. VOB file) area 132, and a control data backup (HD_VMG. BUP file) area 133.

As shown in (f) of FIG. 1, the video title set No. n recording area 140 has a control data (HD_VTS. IFO file) area 141, a video-object-for-menu (HD_VTSM. VOB file) area 142, a video-object-for-title (HD_VTS. VOB file) area 143, and a control data backup (HD_VTS. BUP file) area 144.

<Example of Optical Disk Apparatus According to the Invention>

FIG. 2 shows an optical disk apparatus carrying out reproducing processing, which reads out the stored information from the disk-shaped information recording medium D and performs decoding processing to reproduce the information, and recording processing, which performs encoding processing by receiving an image signal, a sub-image signal, and a sound signal and records it in the disk-shaped information recording medium D.

In FIG. 2, the information recording medium D is mounted in a disk driving portion 11. The disk driving portion 11 rotates the mounted information recording medium D, reads the information stored in the information recording medium D using an optical pickup or the like, and decodes the information to reproduce it, or records the information according to the encoded signal in the information recording medium D. Further, a PGC setting portion 34 during resuming operation and timer operation, which is connected to an MPU 13, is provided in the optical disk apparatus according to the invention. The action using the PGC setting portion 34 will be described below in detail referring to the flow chart.

(Reproducing Process)

An outline of the reproducing processing of the optical disk apparatus according to the invention will be described below. The information which has read by the disk driving portion 11 is supplied to the MPU (Micro Processing Unit) 13, and it is stored in a buffer (not shown) after carrying out error correction processing. Of the information stored in the buffer, the management information of the above-described control data areas 131 and 141 are recorded in a memory 14 and utilized for reproduction control, data management, or the like.

Of the information stored in the buffer, the information of the above-described video object areas 132, 142 and 143 are transferred to a separating portion 26 and separated in each of a main image pack 203, sound packs 204a and 204b, and sub-image packs 205a and 205b.

The information of the main image pack 203, the information of the sound packs 204a and 204b, and the information of the sub-image packs 205a and 205b are supplied to an image decoder 27, a sound decoder 29, and a sub-image decoder 28 respectively, and the decoding processing is carried out.

The main image information decoded in the image decoder 27 and the sub-image information decoded in the sub-image decoder 28 are supplied to a D-processor 30 to carry out superimposing processing and converted into the analog form by a D/A (Digital/Analog) converter 31, or the sub-image information is directly converted into the analog form by a D/A converter 32 and outputted in the form of the image signal to an image display apparatus such as a cathode ray tube (not shown).

The sound information decoded in the sound decoder 29 is converted into the analog form and outputted in the form of the sound signal to a sound reproducing apparatus such as a speaker (not shown).

The above-described series of reproducing actions to the information recording medium D is controlled totally by the MPU 13. The MPU 13 receives the operation information from a key input portion 12 and controls each portion on the basis on a program stored in a ROM (Read Only Memory) 15.

(Recording Processing)

The recording processing of the optical disk apparatus according to the invention will be described. In FIG. 2, each data inputted through each input terminal of the image and the sound (and the sub-image) is supplied to A/D converters 17, 18, and 19 and converted from an analog signal into a digital signal. The video data converted into the digital signal by the A/D converter 18 is supplied to an image encoder 20 to be encoded. The sub-image information converted into the digital signal by the A/D converter 18 is supplied to a sub-image encoder 21 to be encoded. The audio data converted into the digital signal by the A/D converter 19 is supplied to a sound encoder 22 to be encoded.

Each data of the image and the sound (and the sub-image), which is encoded in each encoder, is supplied to a multiplexer (MUX) 16 and changed to a packet and a pack to constitute an MPEG-2 program stream in the form of the video pack and the audio pack (and the sub-image pack). The multiplexed data group is supplied to a file formatter 25 and converted into a file conforming to a file structure which can be recorded and reproduced by the optical disk apparatus. The file is supplied to a volume formatter 24, and a data format conforming to a volume structure which can be recorded and reproduced by the optical disk apparatus, is formed. At this point, the reproducing control information for reproducing the data filed in the file formatter 25 and the like are added. Then, the filed data is supplied to a physical formatter 23 and recorded in the information recording medium D by the disk driving portion 11.

The reproducing action and the recording action are executed by the MPU 13 under instruction from the key input portion 12 on the basis of a series of processing programs stored in the ROM 15 of the optical disk apparatus.

Though both the encoding processing and the decoding processing are carried out in the optical disk apparatus, the encoding processing may be solely carried out by an authoring system or the like, and the decoding processing may be solely carried out with an optical disk reproducing apparatus such as a DVD player.

First Embodiment

Figure 4:
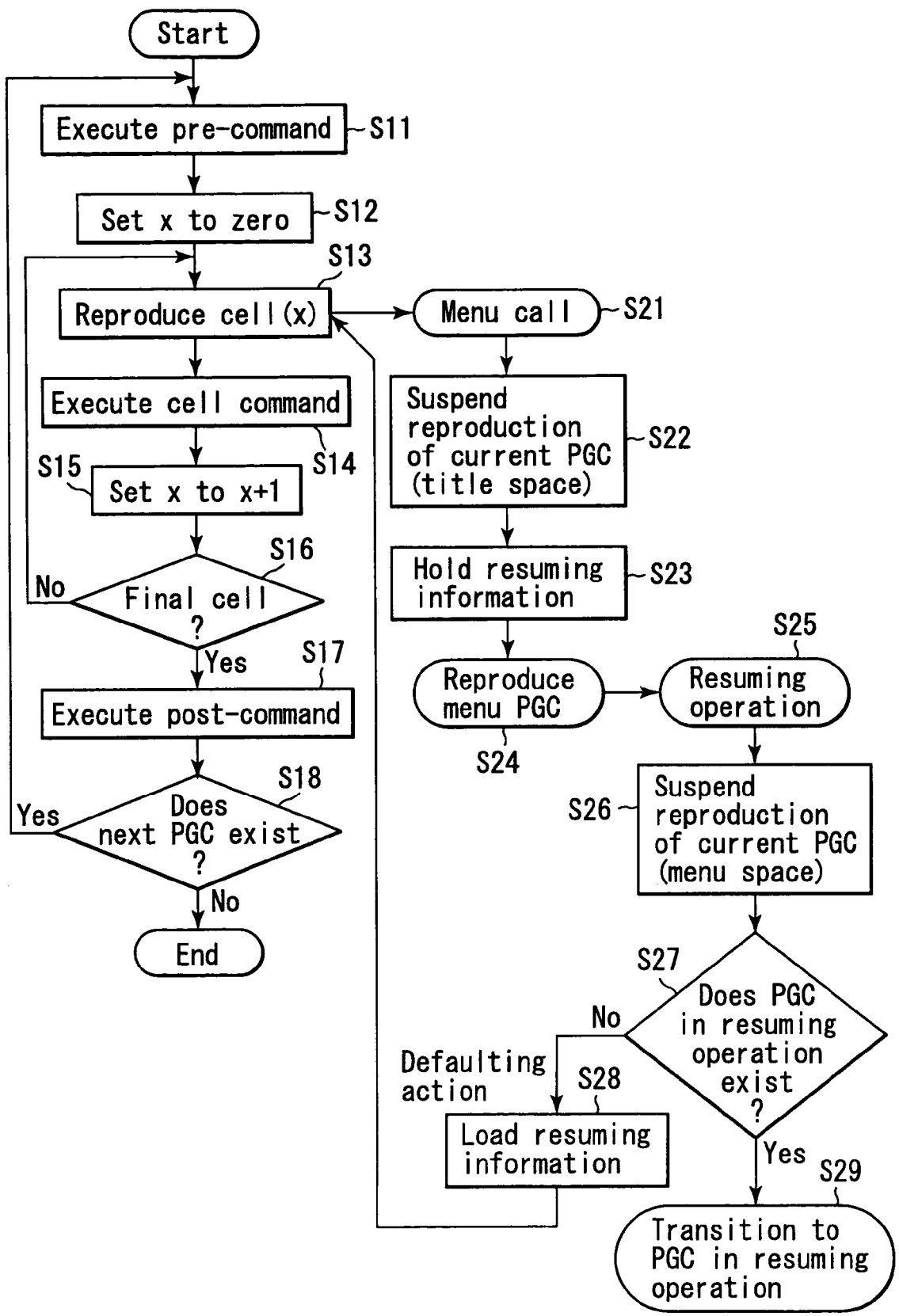
FIG. 4 is a flow chart showing an example of a reproducing method according to the first embodiment of the invention.

A first embodiment of the invention shows a case in which a predetermined PGC number and the like are allocated to predetermined operation as user-operable transition information of PGC information. FIG. 3 shows an example of the structure of the PGC information according to the first embodiment of the invention, and FIG. 4 is a flow chart showing an example of a reproducing method according to the first embodiment of the invention.

As shown in FIG. 3, in the first embodiment of the invention, the user-operable transition information is recorded as the PGC information, and a PGC number in resuming operation or a PGC number in pausing operation is set. In this case, the PGC number in the resuming operation is defined as PGC to be transited in the case that the resuming operation is carried out. Further, the PGC number in the pausing operation is defined.

The reproducing method using the above-described information will be described referring to the flow chart shown in FIG. 4. In the flow chart, one PGC is processed and a pre-command is executed (S11), x is set to zero (S12), the cell (x) is reproduced (S13), and the cell command is correspondingly executed (S14). Further, setting x to x+1 (S15), the cell is reproduced up to the final cell (S16). In the case of the final cell, a post-command is executed (S17) and the flow proceeds to next PGC (S18).

When the user operates menu call on the way of reproducing the cell (S21), in the reproducing apparatus, the reproduction of PGC in the title space is suspended (S22), and the reproduction of entry PGC in a menu space is started (S24). At this point, the PGC number (No. 2) which has been reproduced in the title space and its reproducing position are stored as resuming information in the reproducing apparatus (S23).

Conversely, when the user carries out the resuming operation in reproducing PGC in the menu space (S25), the reproduction of PGC in the menu space is suspended (S26). If there is PGC in the title space stored in the reproducing apparatus (S27), the reproduction is started from the stored position. That is, the reproduction of PGC No. 2 in the title space finally reproduced is resumed from the position finally reproduced and transited to PGC in the resuming operation (S29). If there is no PGC in the title space stored in the reproducing apparatus (S27), the resuming information is loaded (S28) and the flow is returned to the processing of the cell (x).

Thus, by using the user-operable transition information of the PGC information provided in the first embodiment of the invention, the starting position of the reproduction can be moved to the PGC number in the resuming operation or to the PGC number in the pausing operation.

According to the invention, the action which does not exist in the current DVD-Video standard can be defined in PGC, and the reproducing apparatus which can carry out the reproducing processing of improving user's operability by setting the desired action can be provided.

In the case that PGC in the resuming operation is defined in FIG. 4, for example in PGC in the resuming operation, when the command has been described such that "it is determined whether the title finally reproduced is the original story or VAM, and the same resuming action as the conventional resuming action in the case of the original story, or the action is not returned to the VAM but the reproduction of the original story is started in the case of the VAM," the reproduction control which can not be realized in the current DVD-Video standard like the above-described problem can be carried out.

Second Embodiment

A second embodiment of the invention shows a case in which a predetermined command and the like are allocated to predetermined operation as a PGC command table of PGC information. FIG. 5 shows an example of the structure of the PGC information according to the second embodiment of the invention, and FIG. 6 is a flow chart showing an example of a reproducing method according to the second embodiment of the invention.

The second embodiment differs from the first embodiment in that the action in the case that the resuming operation is carried out is defined as not the PGC number but the command.

In the second embodiment, as shown in FIG. 5, in addition to the conventional pre-command, post-command, and cell command, a user-operable call back command is newly described in a command area of PGC.

Figure 6:
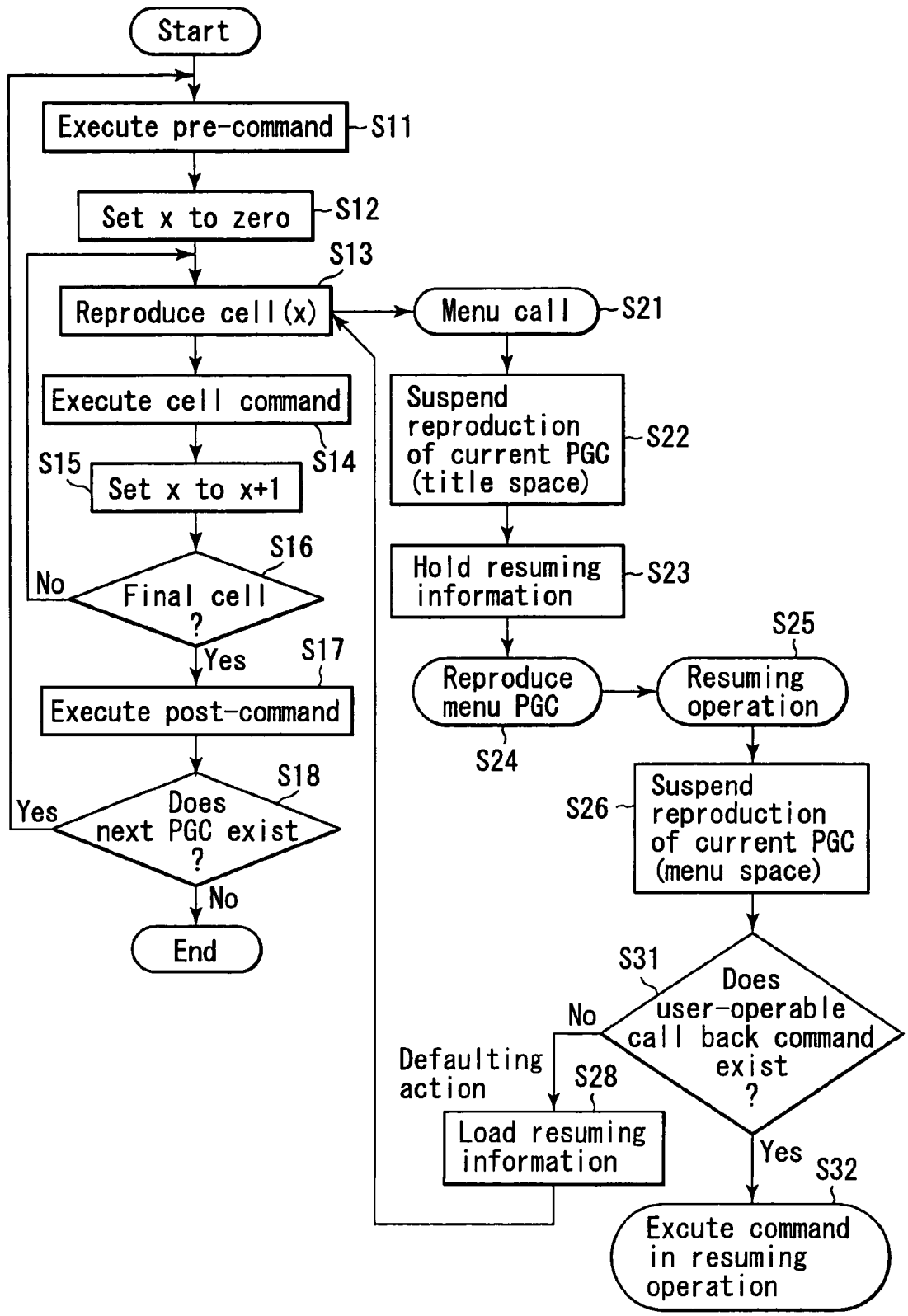
FIG. 6 is a flow chart showing an example of a reproducing method according to the second embodiment of the invention.

FIG. 6 shows the example of the flow chart of the reproducing method using the above-described information. In the flow chart, the action is similar to that of the flow chart shown in FIG. 4, and the step S27 in FIG. 4 is changed to the step S31. At this point, it is determined whether the user-operable call back command exists or not (S31). If the user-operable call back command exists, the command is executed (S32).

For example, in the command in the resuming operation, when the command has been described such that "it is determined whether the title finally reproduced is the original story or VAM, and the same resuming action as the conventional resuming action in the case of the original story, or the action is not returned to the VAM but the reproduction of the original story is started in the case of the VAM," the same reproduction control as in the first embodiment can be carried out.

Though the examples of the PGC and command, which define the action to the resuming operation of the user, are cited in the first embodiment and the second embodiment, the invention is not applied to only the resuming operation. The desired reproducing processing, which can not be realized in the current DVD-Video standard, can be realized by defining the call back PGC and the command to other user operations.

For example, in the case that the user operates a pause button in reproducing PGC such that the user answers a quiz, the command (or PGC) of reducing a score can be recorded by the definition of the command.

Third Embodiment

Figure 7:
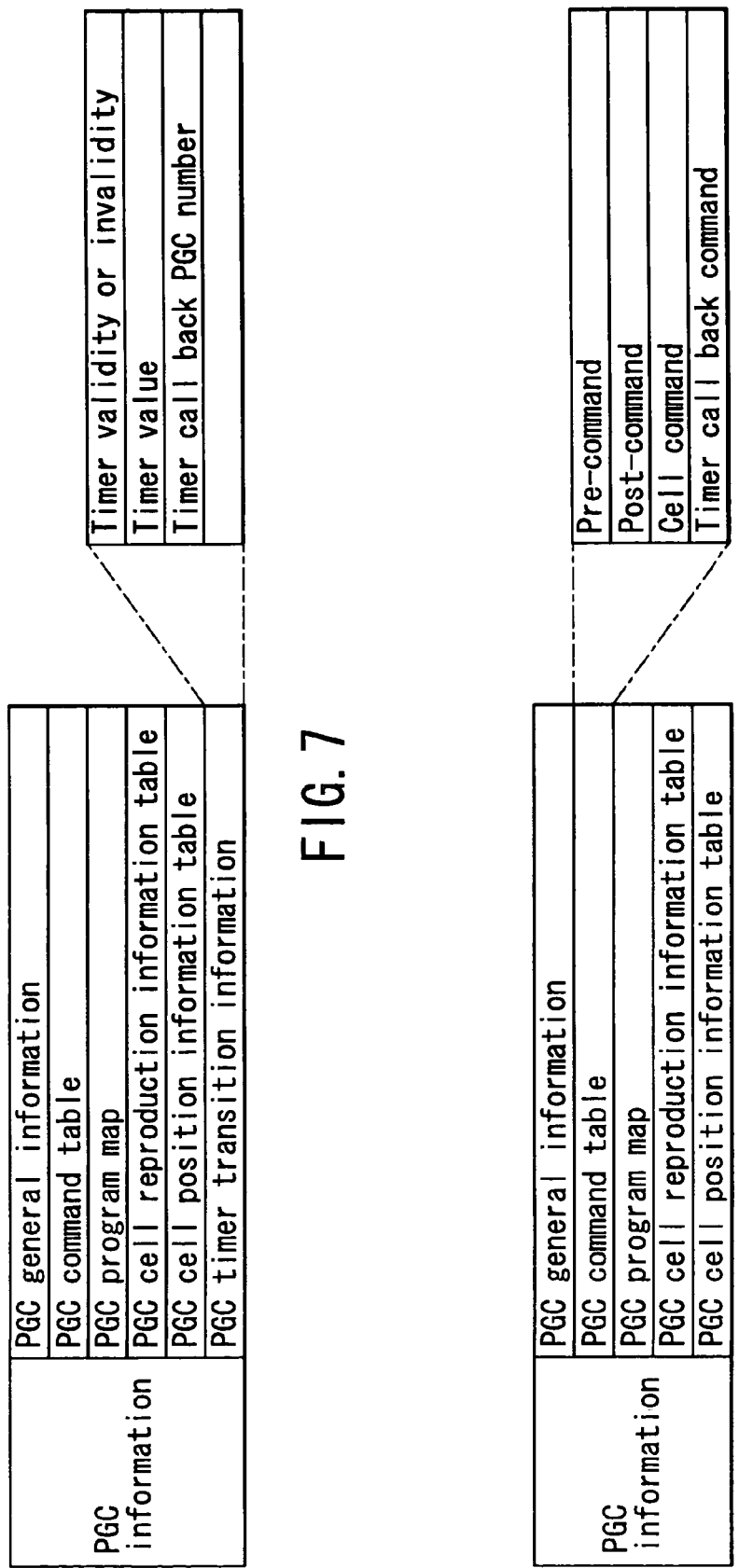
FIG. 7 shows an example of the structure of PGC information according to a third embodiment of the invention.

A third embodiment of the invention shows a case in which timer control information and a predetermined PGC number are allocated as PGC timer transition information of PGC information. FIG. 7 shows an example of the structure of the PGC information according to the third embodiment of the invention, and FIG. 8 is a flow chart showing an example of a reproducing method according to the third embodiment of the invention.

In FIG. 7, the timer transition information is recorded as the PGC information, and validity or invalidity of the timer, a timer value (time), and call back PGC are defined.

Figure 8:
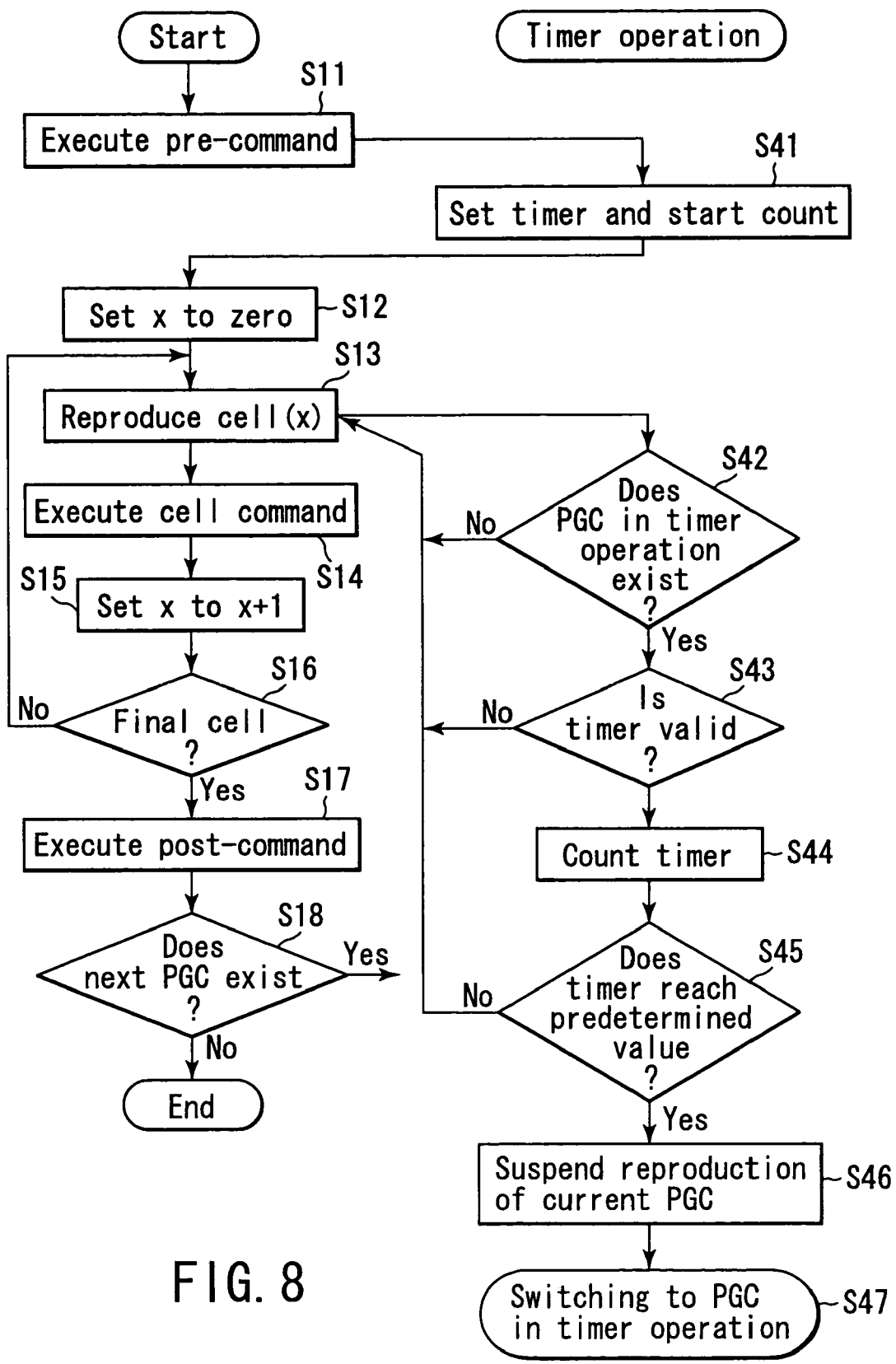
FIG. 8 is a flow chart showing an example of a reproducing method according to the third embodiment of the invention.

The example of the flow chart of the reproducing method using the above-described information is shown in FIG. 8. In the flow chart, steps S11 to S18 in the case of the processing of PGC are similar to the steps in FIG. 4, so that the description is omitted. When the pre-command is executed in step S11, the timer is set and count is started (S41). In the case that a check of the timer is carried out in reproducing PGC, an on timer PGC which is PGC in timer operation exists (S42), the timer is valid (S43), the timer is counted (S44), and the count reaches a predetermined value (S45), the reproduction of the current PGC is suspended (S46) and the reproduction is transited to the on timer PGC (S47).

When an image (such as a screen saver) which a disk manufacturer has previously prepared has been recorded as the on timer PGC, the convenient reproducing processing which can not be realized in the current DVD-Video standard like the above-described problem can be carried out.

Fourth Embodiment

A fourth embodiment of the invention shows a case in which a timer call back command and the like are allocated as a PGC command table of PGC information. FIG. 9 shows an example of the structure of the PGC information according to the fourth embodiment of the invention, and FIG. 10 is a flow chart showing an example of a reproducing method according to the fourth embodiment of the invention.

The fourth embodiment differs from the third embodiment in that the action in the case that the timer is valid is defined as not the PGC number but the command.

In the fourth embodiment, as shown in FIG. 9, in addition to the conventional pre-command, post-command, and cell command, a timer call back command is newly described in a command area of PGC.

Figure 10:
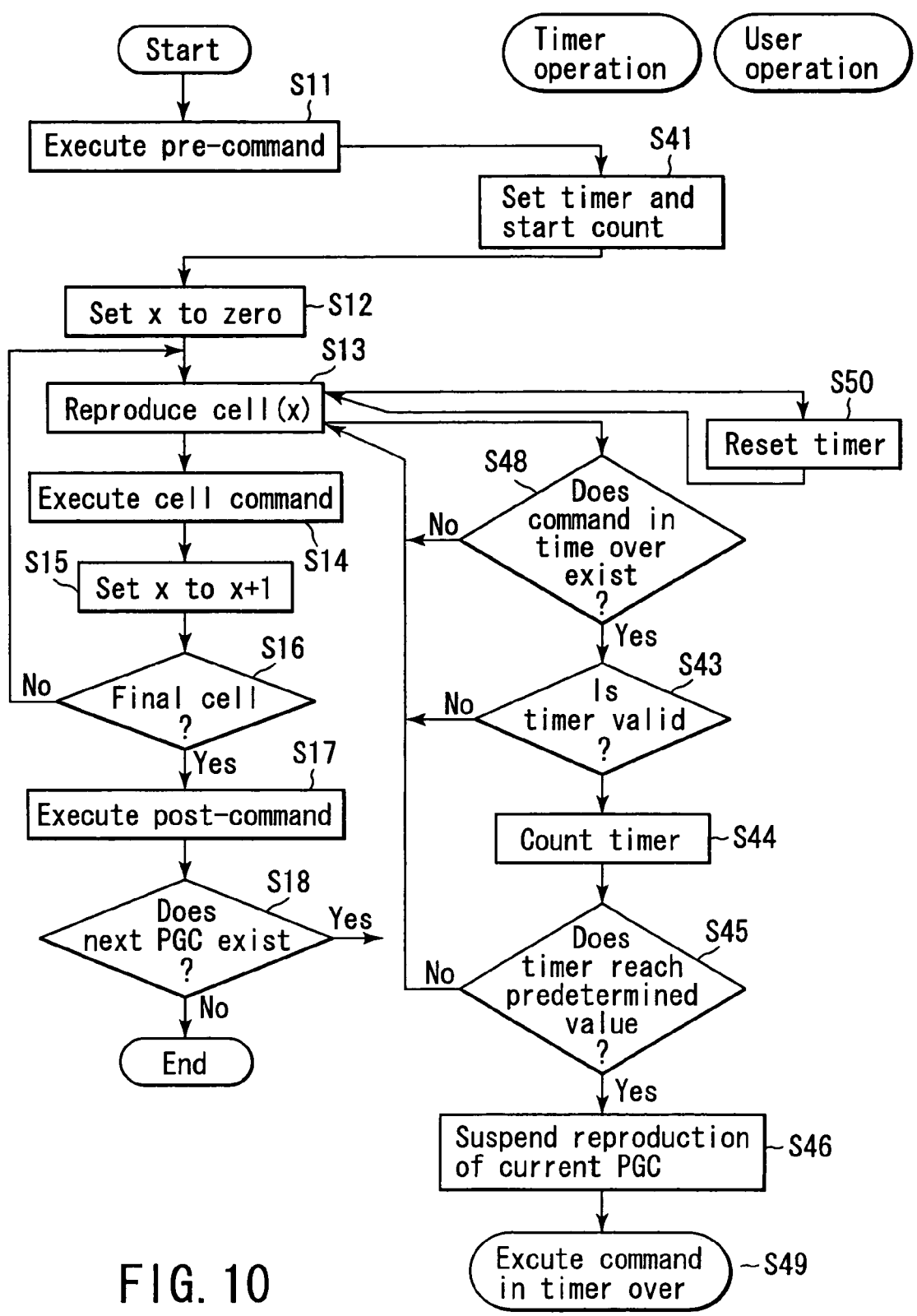
FIG. 10 is a flow chart showing an example of a reproducing method according to the fourth embodiment of the invention.

Though the flow chart shown in FIG. 10 is almost identical with the flow chart shown in FIG. 8, the flow chart shown in FIG. 10 has a function in the form of the user operation, which always determines whether the timer is reset or not in reproducing the cell (S50). Further, instead of the step S42 in the flow chart shown in FIG. 8, it is determined whether the command is present or absent in time over (S48), and the command in the time over is executed (S49) after the same determination as that of FIG. 8.

Even in the fourth embodiment, in the timer call back command, when the command has been described such that "transiting to PGC including the image previously prepared," the same reproduction control as in the third embodiment can be carried out.

Fifth Embodiment

Figure 11:
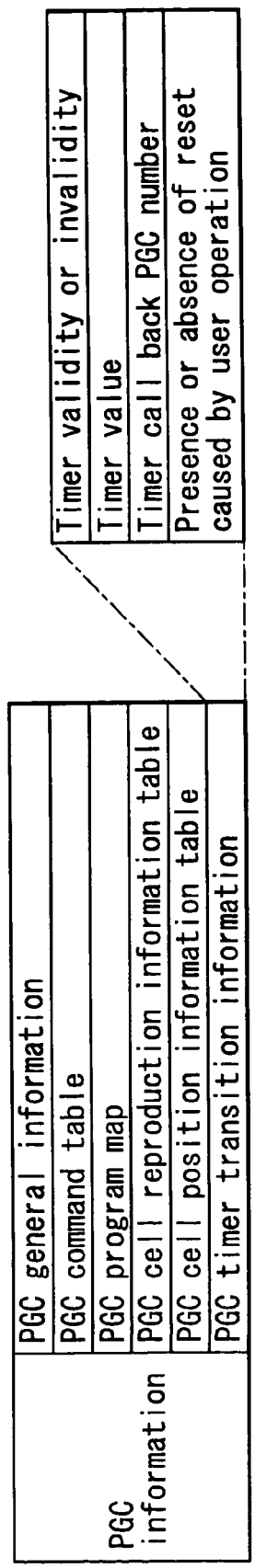
FIG. 11 shows an example of the structure of PGC information according to a fifth embodiment of the invention.
Figure 12:
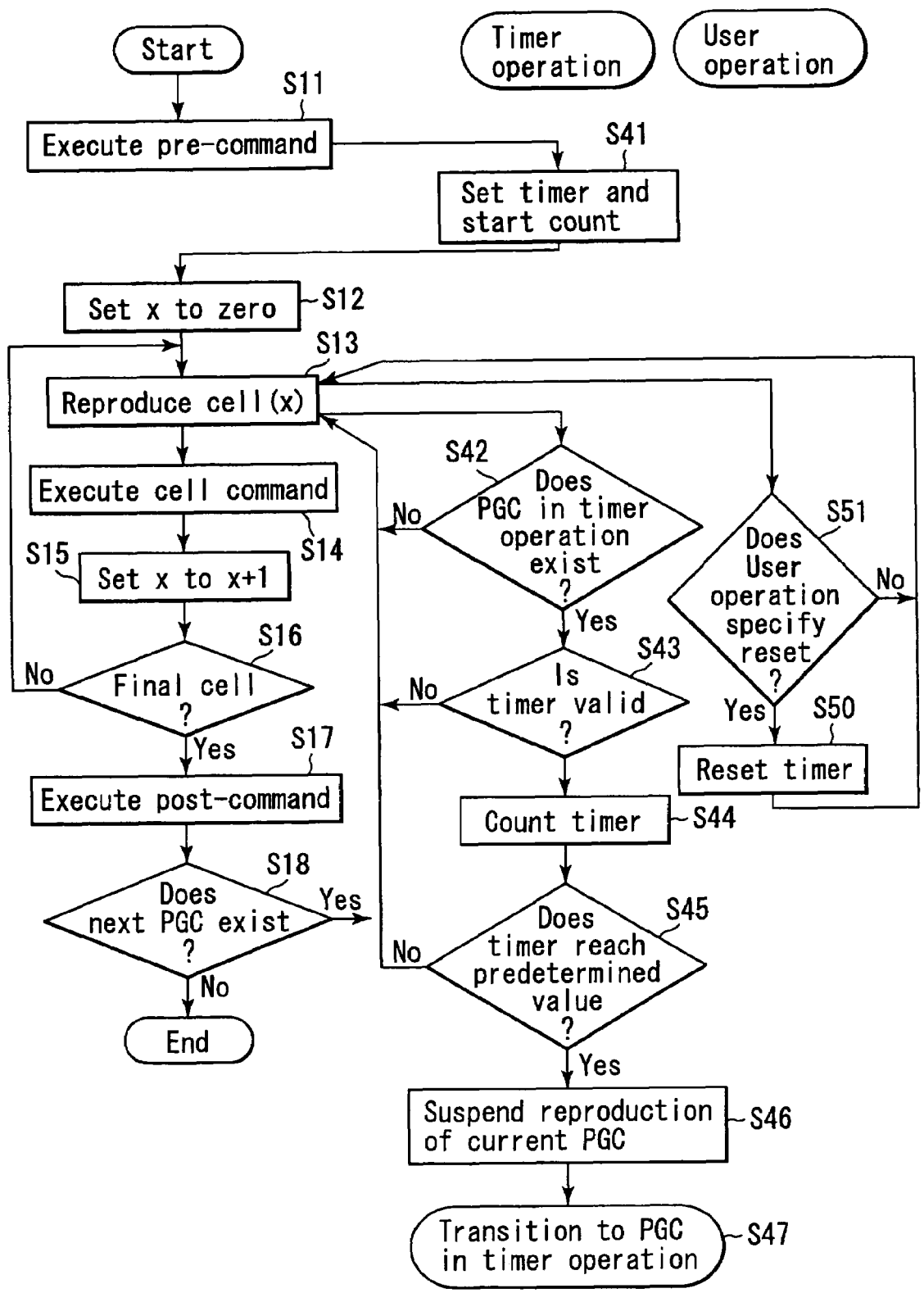
FIG. 12 is a flow chart showing an example of a reproducing method according to the fifth embodiment of the invention.

A fifth embodiment of the invention shows a case in which timer control information, a predetermined command, and the like are allocated as PGC timer transition information of PGC information. FIG. 11 shows an example of the structure of the PGC information according to the fifth embodiment of the invention, and FIG. 12 is a flow chart showing an example of a reproducing method according to the fifth embodiment of the invention.

The fifth embodiment differs from the third embodiment in that control information whether a timer is reset or not according to user operation is included in PGC.

Accordingly, for example in the case that the user operates a cursor key of a remote controller after a timer value is set to 120 seconds at a header of menu PGC and the count of the timer is started, the control of the reproduction can be realized such that the reproduction of a predetermined image is started after 120 seconds from the final user operation in such a manner that the timer value is returned to the initial value of 120 seconds and the count is started again.

As shown in FIG. 11, whether the timer is reset or not by the user operation is specified at every time as, for example, PGC timer transition information. In the reproducing apparatus, as shown in FIG. 12, the finer reproducing control can be also realized in such a manner that the reset action is carried out on the basis of the specification according to the user operation or the reset is not carried out even if the user operation is carried out.

In addition to the respective steps in the flow chart shown in FIG. 8, the reset of the timer is carried out when both "the presence or absence of the reset caused by the user operation in the PGC timer transition information" and the user operation specify the reset in the flow chart shown in FIG. 12 (S50).

In the fifth embodiment, degree of freedom of the setting in the reproduction can be improved in such a manner that control information whether the timer is reset or not is also set in PGC according to the user operation.

While those skilled in the art can realize the invention by various embodiments described above, it will be easily understood by those skilled in the art that various modifications of such embodiments can be made, and it is possible without any inventive ability to apply various embodiments. Accordingly, the invention covers a wide range consistent with disclosed principles and novel features, and the invention is not limited to the above-described embodiments.

According to the invention, the information recording method and information recording apparatus for carrying out the reproducing processing in which the arbitrary action can be made according to the arbitrary operation, and the information recording medium therefore can be provided in such a manner that the arbitrary action which is limited in the current DVD-Video standard is setting in PGC.

What is claimed is:

1. An information storage medium encoded with a data structure comprising:
    a video and a data recording area included within a data area,
    wherein the video and the data recording area includes a program chain command table information having a description area, the description area storing a pre-command, a post-command, a cell command, and a resume command, wherein the resume command is processed in a disk player which reproduces the information medium such that when a resume operation is executed, the disk player is configured to check an existence of the resume command in the program chain command table information which is specified by a resume information, before starting playback of the program chain command table information, and when the resume command exists in the program chain command table information, the resume command is executed at first in the disk player and when the resume command does not exist in the program chain command table information, the resume operation is executed in the disk player, wherein a predetermined command is configured to determine whether a title reproduced last is an original story or a value-added image and wherein the predetermined command is configured to command a resuming action in the case of the original story or command not to return to the value-added image but to start reproduction of the original story.

2. An information storage medium according to claim 1, wherein the resume command is a command configured to be executed when a timer is made valid and a predetermined time is elapsed.

3. An information storage medium according to claim 1, wherein a reproducing control information stored in the video and the data recording area defines other reproducing control information which is linked when a timer is made valid and the predetermined time is elapsed.

4. An information storage medium according to claim 1, wherein the information recording medium is an optical disk.

* * * * *